(No Model.)
N. A. WEEK & H. J. MOEN.
HAND TRUCK.
No. 506,290. Patented Oct. 10, 1893.
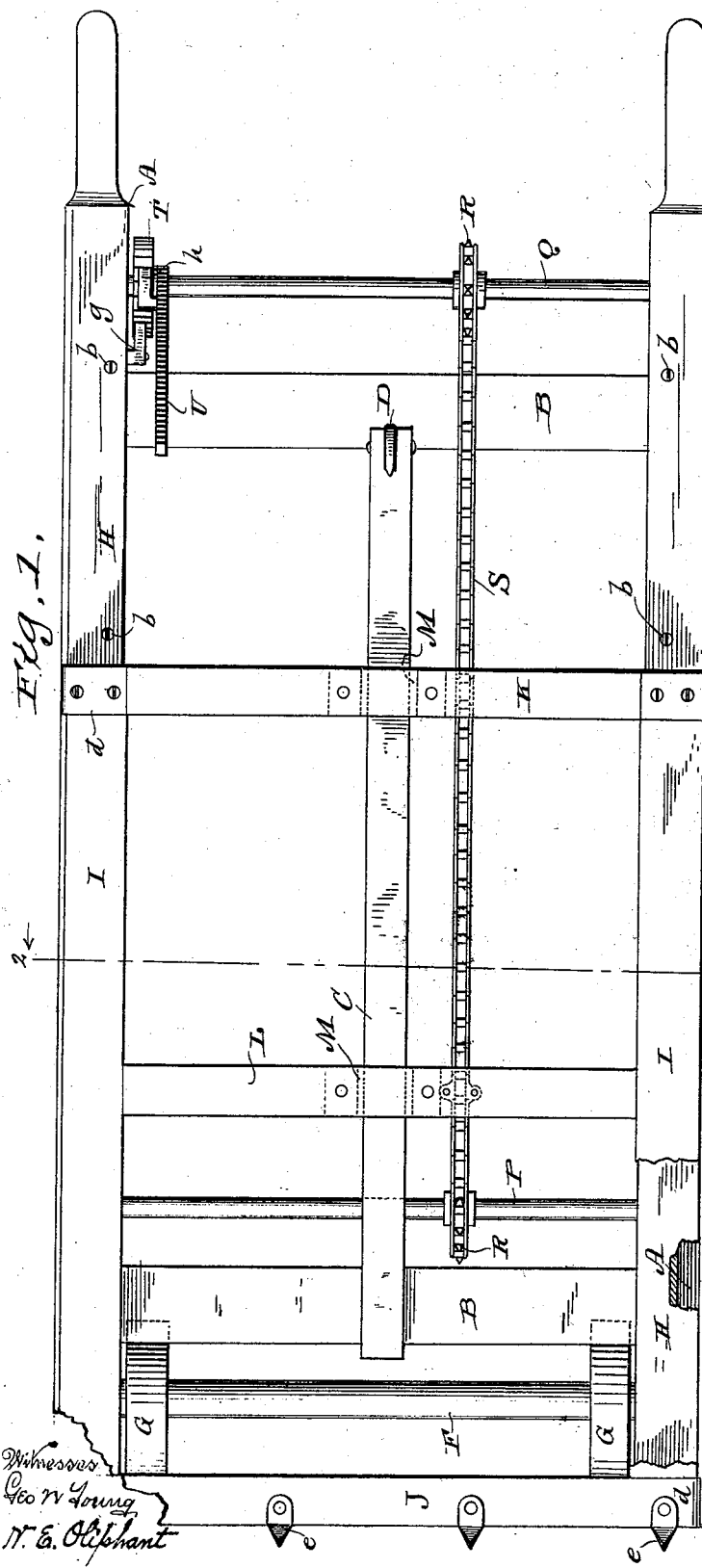
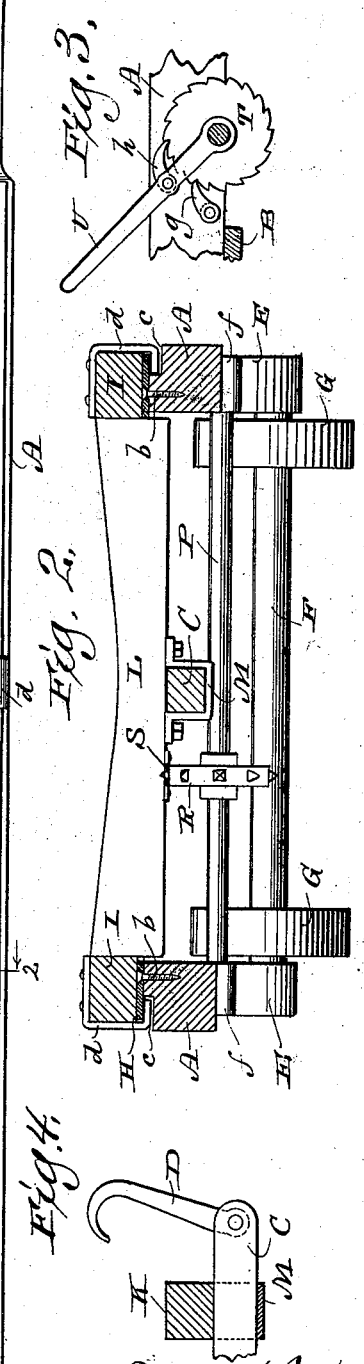

UNITED STATES PATENT OFFICE.

NELSON A. WEEK AND HANS J. MOEN, OF STEVENS' POINT, WISCONSIN.

HAND-TRUCK.

SPECIFICATION forming part of Letters Patent No. 506,290, dated October 10, 1893.

Application filed March 1, 1893. Serial No. 464,151. (No model.)

*To all whom it may concern:*

Be it known that we, NELSON A. WEEK and HANS J. MOEN, citizens of the United States, and residents of Stevens' Point, in the county of Portage, and in the State of Wisconsin, have invented certain new and useful Improvements in Hand-Trucks; and we do hereby declare that the following is a full, clear, and exact description thereof.

Our invention has for its object to provide a hand-truck having a movable carriage for load, whereby the latter may be elevated or run back toward the operator, and said invention consists in certain peculiarities of construction and combination of parts hereinafter specified with reference to the accompanying drawings and subsequently claimed.

In the drawings:—Figure 1 represents a plan view of our improved truck with parts broken away; Fig. 2, a vertical transverse section on line 2—2 of the preceding figure; Fig. 3, a detail elevation of a pawl-and-ratchet mechanism constituting part of the truck herein set forth, and Fig. 4, a like view, partly in section, illustrating a stay-hook pivotally connected to a bar that is loosely engaged by brackets on the movable carriage.

Referring by letter to the drawings A represents the wooden handle-bars of our truck, B braces of like material joined to the handle-bars intermediate of their ends, C another bar of similar material that is loose in brackets on a movable carriage hereinafter specified, and D a hook pivotally connected to the rear end of the latter bar. As is usual in the art, the handle-bars are provided with depending bearings E for the axle F of a pair of wheels G, these bearings being adjacent to the forward ends of said handle-bars.

The handle-bars herein shown have their upper sides faced with metal plates H, held in place by screws b or other suitable means, and the upper outer edges of said handle-bars are cut away, as shown at c, whereby we form grooves or guideways for clips d on a movable carriage that constitutes part of our invention.

The movable carriage comprises a pair of bars I that rest upon the metal plates H and are joined together by a series of cross-pieces. As herein shown two of the cross-pieces J, K, join the ends of the bars I and have the aforesaid clips d fast thereon. An intermediate cross-piece L and the one K are provided with depending brackets M that support and guide the hook-bar C above specified.

The forward bar J of the carriage is shown as provided with a series of spurs e designed to be forced under a box, barrel, bale or other load prior to a tilt of the latter onto the truck, but instead of these spurs an angle-iron, such as is common in the art to which our invention relates, may be as readily employed.

In addition to the axle-bearings above specified, the handle-bars A are provided with other bearings f for front and rear shafts P, Q, and fast on each of these shafts is a sprocket-wheel R that engages with a link-belt S fast to the intermediate cross-piece L of the carriage. The shaft Q is also shown as having a ratchet wheel T fast thereon and in engagement with a detent g pivoted to an adjacent handle-bar of the truck.

Loose on the shaft Q is a lever U provided with a pivotal pawl h that also engages with the ratchet wheel T on said shaft, and by actuating the lever the link-belt gear is set in motion to run back the carriage above specified, the load upon the latter being then engaged by the hook D and held in place.

We do not wish to be understood as limiting ourselves to the mechanism herein shown and described for operating the carriage, as a variety of other means equally applicable may be devised for the same purpose.

Having now fully described our invention, what we claim as new, and desire to secure by Letters Patent, is—

1. A hand-truck comprising a main-frame, a load-carriage longitudinally adjustable on the main-frame, brackets that depend from the load-carriage, a bar loose in the brackets, and a hook pivoted to the rear end of the bar, substantially as set forth.

2. A hand-truck comprising a main-frame, a load-carriage loose thereon in a longitudinal direction, a link-belt-gear connecting the main-frame and load-carriage, and a lever-controlled pawl-and-ratchet mechanism for actuating said gear, substantially as set forth.

3. A hand-truck comprising a main-frame, transverse shafts having their bearings in the frame, a sprocket-wheel on each shaft, a link-belt arranged on the sprocket-wheels, suitable means for imparting motion to one of the shafts, and a load-carriage that rests on said frame and is fast to the link-belt, substantially as set forth.

In testimony that we claim the foregoing we have hereunto set our hands at Stevens' Point, in the county of Portage and State of Wisconsin, in the presence of two witnesses.

NELSON A. WEEK.
HANS J. MOEN.

Witnesses:
D. LLOYD JONES,
A. E. REDFIELD.